(12) United States Patent
Yamauchi et al.

(10) Patent No.: US 11,292,416 B2
(45) Date of Patent: Apr. 5, 2022

(54) AIRBAG DEVICE

(71) Applicant: ASHIMORI INDUSTRY CO., LTD., Settsu (JP)

(72) Inventors: Keita Yamauchi, Settsu (JP); Daijiro Katayama, Settsu (JP); Kazuki Isoda, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 124 days.

(21) Appl. No.: 16/677,777

(22) Filed: Nov. 8, 2019

(65) Prior Publication Data

US 2020/0148151 A1 May 14, 2020

(30) Foreign Application Priority Data

Nov. 13, 2018 (JP) .............................. JP2018-212985

(51) Int. Cl.
*B60R 21/203* (2006.01)
*B60R 21/235* (2006.01)
*B60R 21/239* (2006.01)

(52) U.S. Cl.
CPC .......... *B60R 21/203* (2013.01); *B60R 21/235* (2013.01); *B60R 21/239* (2013.01); *B60R 2021/23509* (2013.01)

(58) Field of Classification Search
CPC ... B60R 21/203; B60R 21/239; B60R 21/235; B60R 2021/23509
See application file for complete search history.

(56) References Cited

U.S. PATENT DOCUMENTS

| | | | | |
|---|---|---|---|---|
| 5,492,363 A | * | 2/1996 | Hartmeyer | B60R 21/239 280/738 |
| 5,496,063 A | * | 3/1996 | Conlee | B60R 21/239 280/739 |
| 5,566,972 A | * | 10/1996 | Yoshida | B60R 21/2171 280/728.2 |
| 7,118,127 B2 | * | 10/2006 | Damm | B60R 21/239 280/739 |
| 8,191,926 B2 | * | 6/2012 | Schneider | B60R 21/276 280/739 |

(Continued)

FOREIGN PATENT DOCUMENTS

| CN | 1827430 A | * | 9/2006 |
|---|---|---|---|
| JP | 11-348713 A | | 12/1999 |

*Primary Examiner* — Faye M Fleming
(74) *Attorney, Agent, or Firm* — Sughrue Mion, PLLC

(57) ABSTRACT

An airbag device includes: an inflator generating gas; a bag-shaped airbag configured to be inflated and deployed, the airbag having a vent hole through which the gas is discharged; and a gas flow adjustment member including: a gas receiving part covering the vent hole; an opening edge portion formed at a portion of an outer peripheral edge of the gas receiving part; and an attachment edge portion for attaching the outer peripheral edge except the opening edge portion to the airbag, the attachment edge portion having an opposite portion which is opposite to the opening edge portion, in which the gas flow adjustment member is provided with at least one pleat portion formed such that a fold extends from the opening edge portion toward the opposite portion, and the at least one pleat portion is configured such that the fold is kept folded at the attachment edge portion.

6 Claims, 10 Drawing Sheets

(56) References Cited

U.S. PATENT DOCUMENTS

| | | | | |
|---|---|---|---|---|
| 8,573,641 B2* | 11/2013 | Marable | ................ | B60R 21/239 |
| | | | | 280/738 |
| 9,016,721 B1* | 4/2015 | Potter | .................... | B60R 21/231 |
| | | | | 280/739 |
| 9,061,646 B2* | 6/2015 | Abele | .................... | B60R 21/206 |
| 9,108,590 B2* | 8/2015 | Williams | .............. | B60R 21/239 |
| 9,573,556 B2* | 2/2017 | Ko | ........................ | B60R 21/261 |
| 9,873,402 B2* | 1/2018 | Saito | .................... | B60R 21/239 |
| 10,427,639 B2* | 10/2019 | Williams | ............ | B60R 21/2338 |
| 2019/0256034 A1* | 8/2019 | Saito | .................... | B60R 21/239 |

* cited by examiner

AIRBAG DEVICE

CROSS-REFERENCE TO RELATED APPLICATIONS

This application is based upon and claims the benefit of priority from prior Japanese patent application No. 2018-212985, filed on Nov. 13, 2018, the entire contents of which are incorporated herein by reference.

TECHNICAL FIELD

The present disclosure relates to an airbag device.

BACKGROUND

In an airbag disclosed in JP-A-H11-348713, a regulating fabric part is attached on an outer surface of the airbag on a peripheral edge part of a vent hole. The regulating fabric part covers the vent hole from an outside of the airbag, thereby regulating a flow direction of gas to be discharged from the vent hole. As shown in FIG. 2 of JP-A-H11-348713, a tip end portion of the regulating fabric part is provided with a loosening portion.

According to the technology disclosed in JP-A-H11-348713, when the airbag is folded, the loosening portion of the regulating fabric part is also folded. For this reason, when inflating the airbag, it is necessary to form an opening by unfolding the folded regulating fabric part.

In order to smoothly receive an occupant by the airbag which has proper hardness, it is preferable to unfold the regulating fabric part more promptly when inflating the airbag.

SUMMARY

It is therefore an object of the present disclosure to unfold a gas flow adjustment member more promptly, and thus, to discharge gas more promptly when inflating an airbag.

In order to solve the above-described problem, an airbag device of a first aspect includes: an inflator configured to generate gas; a bag-shaped airbag folded with being housed and configured to be inflated and deployed by the gas, the airbag having a vent hole through which the gas is discharged to an outside of the airbag; and a gas flow adjustment member including: a gas receiving part covering the vent hole from the outside of the airbag; an opening edge portion formed at a portion of an outer peripheral edge of the gas receiving part; and an attachment edge portion for attaching the outer peripheral edge of the gas receiving part except the opening edge portion to the airbag, the attachment edge portion having an opposite portion which is opposite to the opening edge portion, in which the gas flow adjustment member is provided with at least one pleat portion formed such that a fold extends from the opening edge portion toward the opposite portion of the attachment edge portion, and the at least one pleat portion is configured such that the fold is kept folded at the attachment edge portion.

DETAILED DESCRIPTION

Figure 1:
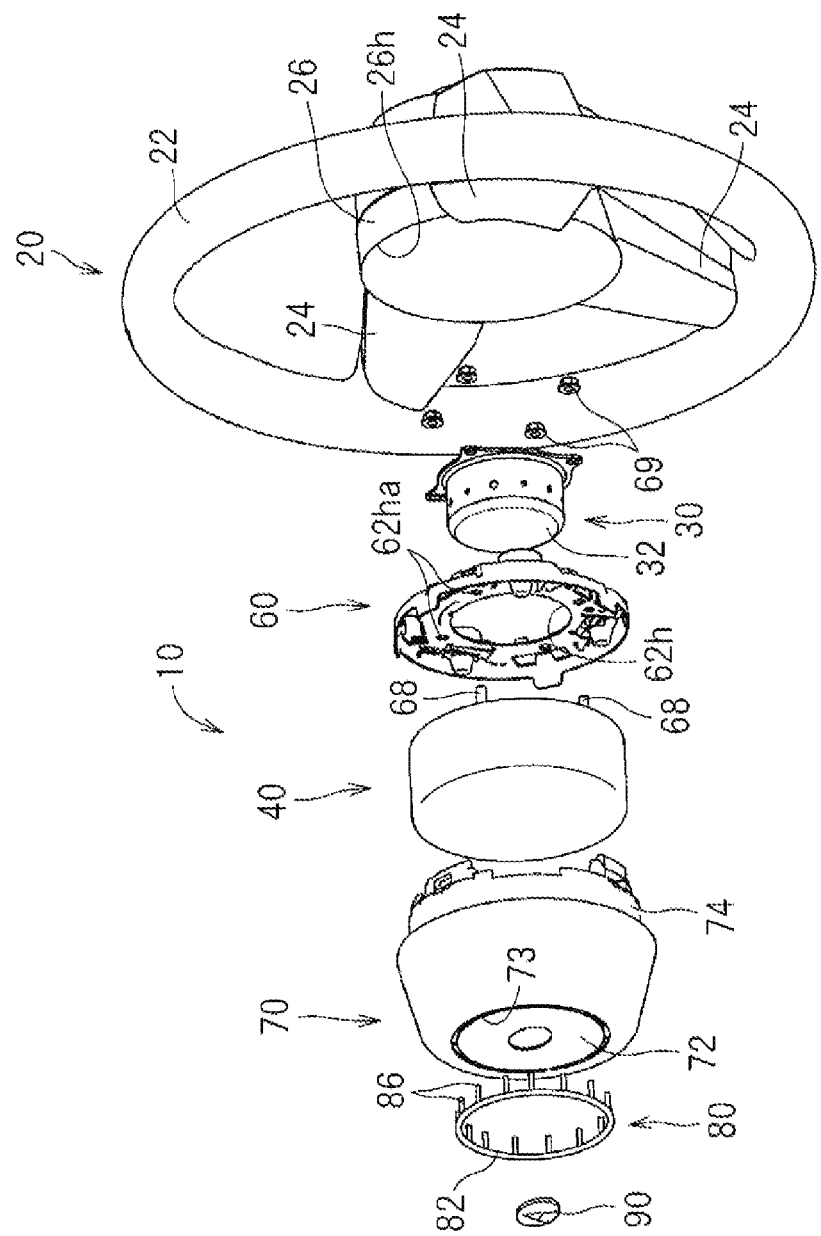
FIG. 1 is an exploded perspective view depicting an airbag device of an exemplary embodiment.

Hereinbelow, an airbag device of an exemplary embodiment will be described. FIG. 1 is an exploded perspective view depicting an airbag device 10. In FIG. 1, a steering wheel 20 to which the airbag device 10 is to be attached is also shown.

The airbag device 10 is attached to the steering wheel 20 of a vehicle. The steering wheel 20 is provided to steer the vehicle. The steering wheel 20 includes a wheel 22, spokes 24, and a wheel hub 26.

The wheel 22 has an annular shape, and is a part that receives steering force by an occupant (driver). The wheel hub 26 is supported to a tip end portion of a steering shaft extending from a part of the vehicle in front of a driver seat toward the occupant. The spokes 24 extend from an inner periphery of the wheel 22 toward a center of the wheel 22. The spokes 24 are coupled to the wheel hub 26. Herein, three spokes 24 are provided, but two spokes may be provided, for example. When the wheel 22 is rotated, the rotation movement of the wheel 22 is transmitted to the steering shaft via the spokes 24 and the wheel hub 26.

The wheel hub 26 is configured such that the airbag device 10 can be attached and housed. Herein, the wheel hub 26 is formed with a housing recess part 26h opened toward the occupant. An attachment member 60 of the airbag device 10 is attached to an inner part of the housing recess part 26h.

Figure 2:
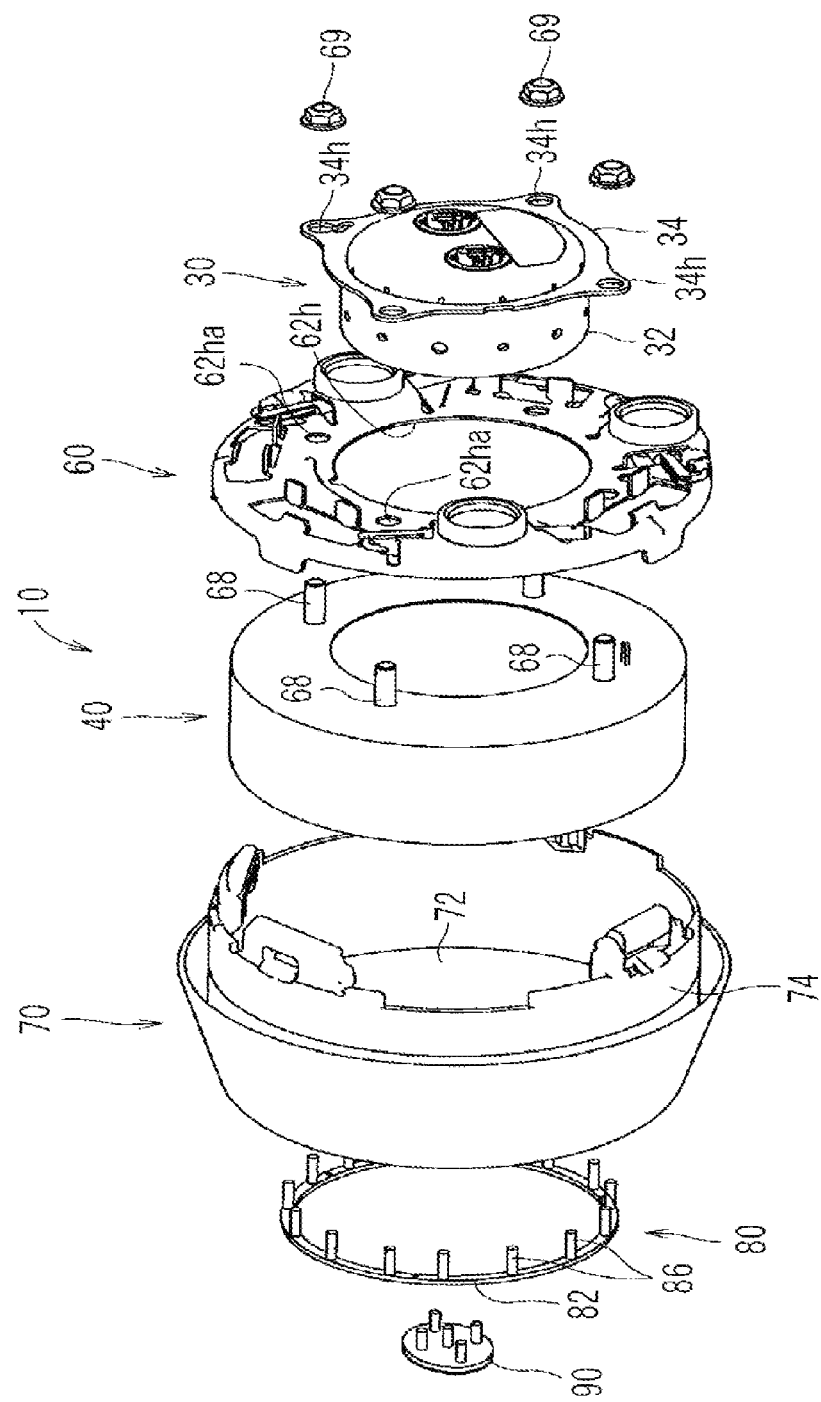
FIG. 2 is an exploded perspective view of the airbag device.
Figure 3:
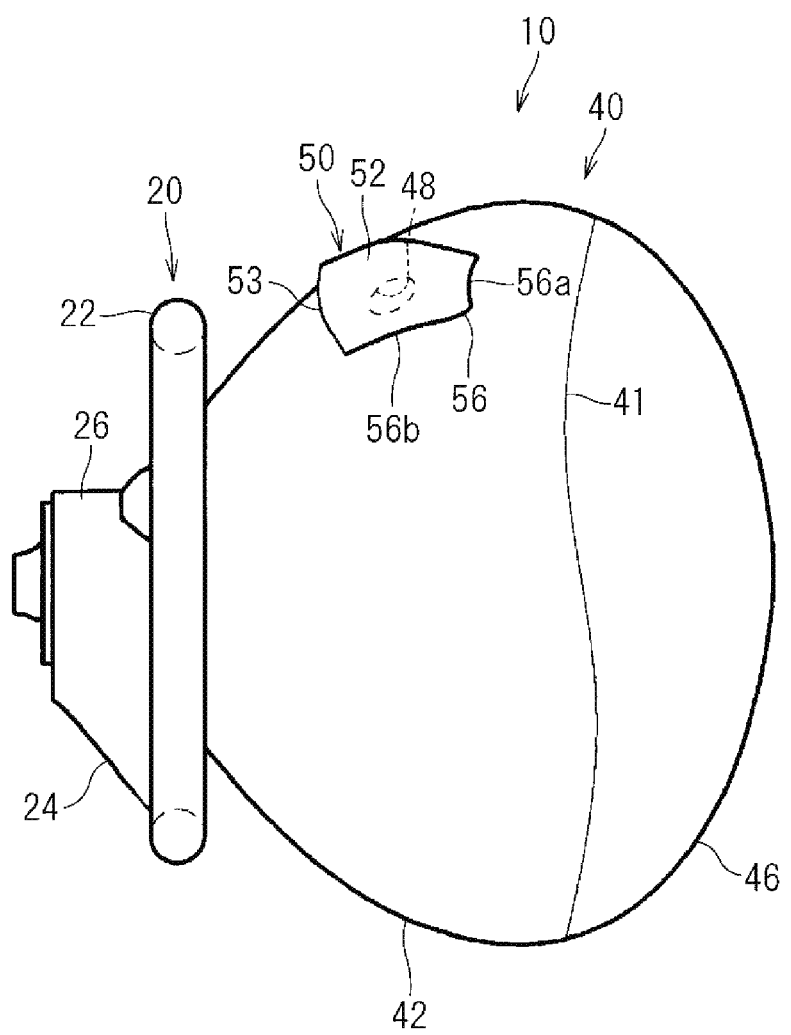
FIG. 3 is a side view of the airbag device in an inflated and deployed state.
Figure 4:
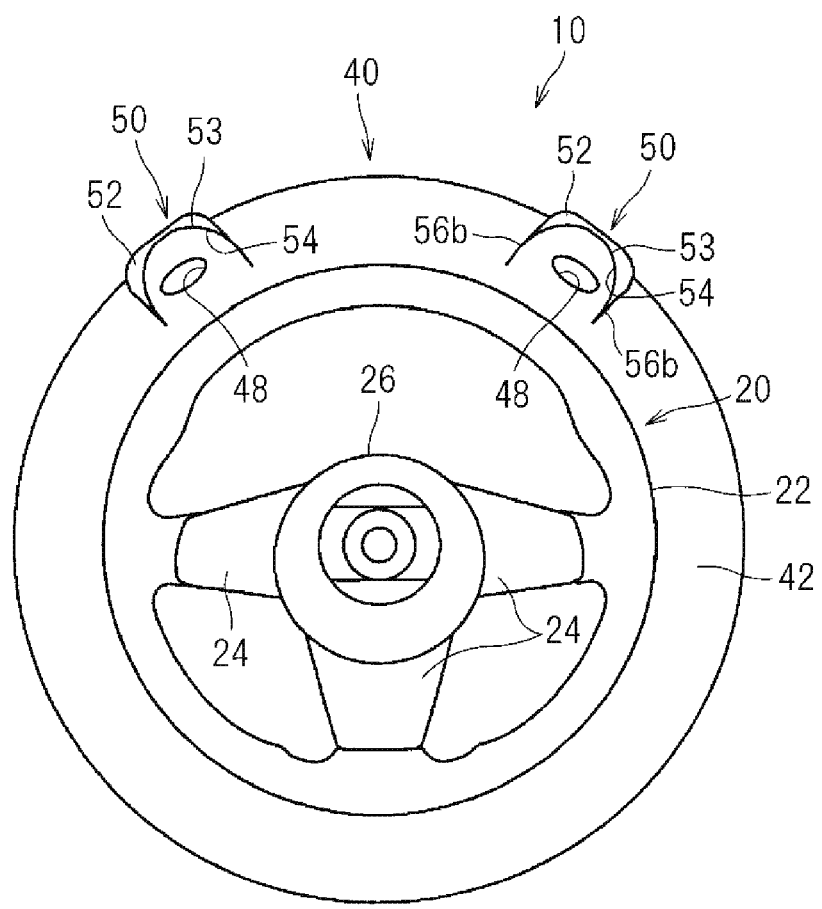
FIG. 4 depicts the airbag device in the inflated and deployed state, as seen from a front side of a vehicle.
Figure 5:
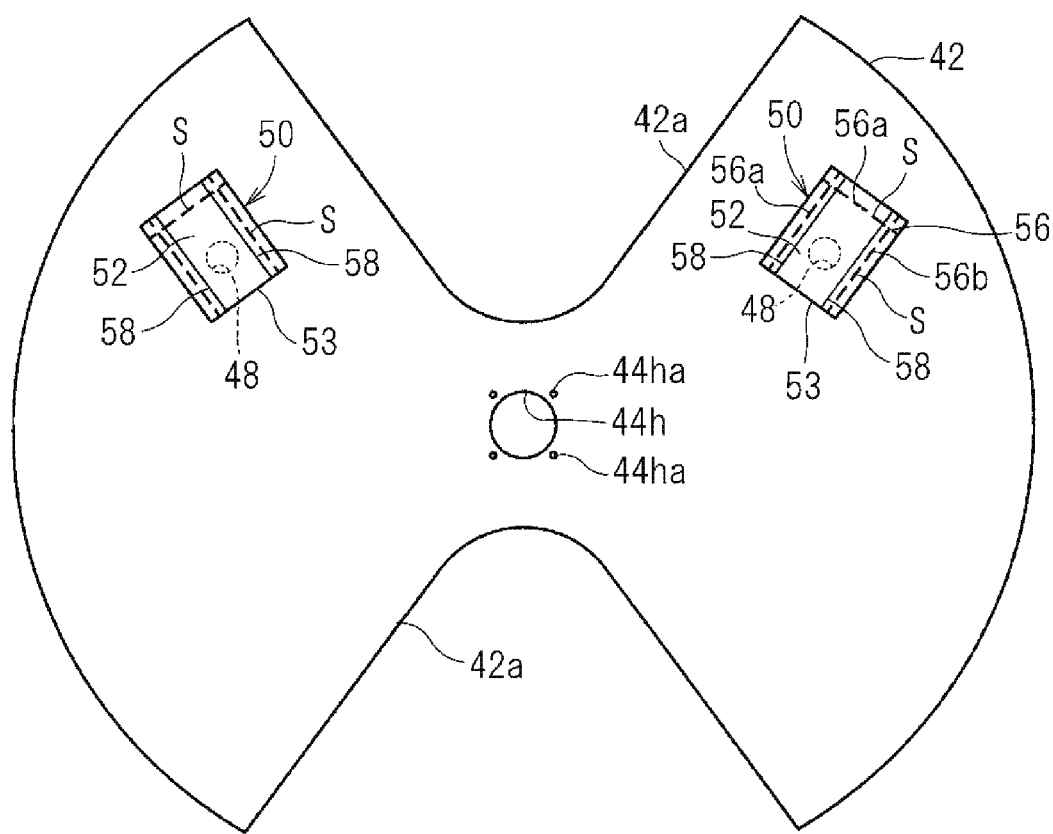
FIG. 5 depicts an example of a steering wheel-side base fabric.

FIG. 2 is an exploded perspective view of the airbag device 10. FIG. 3 is a side view of the airbag device 10 in an inflated and deployed state. FIG. 4 depicts the airbag device 10 in the inflated and deployed state, as seen from a front side of the vehicle in an axial direction of the wheel 22. FIG. 5 depicts an example of a steering wheel-side base fabric 42 configuring the airbag 40.

The airbag device 10 includes an inflator 30, an airbag 40, and gas flow adjustment members 50. Herein, the airbag device 10 is attached to the steering wheel 20 via the attachment member 60.

The inflator 30 is configured to generate gas. Herein, the inflator 30 includes an inflator main body part 32 having a short circular cylinder shape, and an attachment flange 34 formed on an outer periphery of the inflator main body part 32. In the inflator main body part 32, an ignition device, a gas-generating agent and the like are incorporated. When a detection signal and the like from a shock detection unit and the like are received upon collision of the vehicle, the ignition device ignites the gas-generating agent. Thereby, the gas-generating agent is combusted, and the gas generated by the combustion is supplied into the airbag 40.

Thereby, the airbag 40 is inflated and deployed toward the driver. The attachment flange 34 has a plate shape extending from the outer periphery of the inflator main body part 32 in such a manner that an outer peripheral edge of the attachment flange 34 forms a quadrangular shape. Fixing holes 34h are formed at four corner portions of the attachment flange 34.

The airbag 40 is formed to have a bag shape by fabric or the like, and is configured to be inflated and deployed by the gas that is generated by the inflator 30. The airbag 40 is folded with being housed. In the present embodiment, the airbag is folded so as to be housed in the housing recess part 26h. The folding form of the airbag 40 is not particularly limited, but may be a form in which the airbag is folded so as to house in a housing space (herein, a space in the housing recess part 26h) and so as to be inflated and deployed by the gas from the inflator 30. For example, the airbag 40 may be folded in a bellows shape, in a roll shape or in a combination shape thereof.

A specific example of the airbag 40 is described.

The airbag 40 includes a steering wheel-side base fabric 42 and an occupant-side base fabric 46.

The occupant-side base fabric 46 is provided on a side on which the occupant is received. That is, the occupant-side base fabric 46 is a part provided on the occupant-side in a state where the airbag 40 is inflated with being attached to the steering wheel 20. Herein, the occupant-side base fabric 46 is configured by one base fabric piece. The occupant-side base fabric 46 is formed to have a circular shape, for example. As the base fabric, a woven fabric or the like is used. On the base fabric, a coating agent such as silicone and the like may be coated, as required. The occupant-side base fabric 46 may be configured by at least one base fabric piece or may be partially or entirely configured by a plurality of superposed base fabric pieces.

The steering wheel-side base fabric 42 is provided closer to the attachment member 60 (wheel hub 26) than the occupant-side base fabric 46. The steering wheel-side base fabric 42 is attached to the attachment member 60. That is, the steering wheel-side base fabric 42 is a part provided on an opposite side (a front side of the vehicle) to the occupant side in the state where the airbag 40 is inflated with being attached to the steering wheel 20. The steering wheel-side base fabric 42 is configured by one base fabric piece. As the base fabric, a woven fabric or the like is used. On the base fabric, a coating agent such as silicone and the like may be coated, as required. The steering wheel-side base fabric 42 may be configured by at least one base fabric piece or may be partially or entirely configured by a plurality of superposed base fabric pieces.

Herein, the steering wheel-side base fabric 42 has a shape that forms concave parts 42a, each of which has a width gradually narrowing from an outer periphery side toward a center, at portions of the circular outer periphery (herein, two portions facing each other with the center being interposed therebetween) as shown in FIG. 5. When both facing side portions of each of the concave parts 42a are connected to each other by sewing or the like, the steering wheel-side base fabric 42 has a cone-shaped outer peripheral surface shape. When a peripheral edge part of the steering wheel-side base fabric 42 and a peripheral edge part of the occupant-side base fabric 46 are connected to each other by sewing or the like, the bag-shaped airbag 40 is formed. The part at which the peripheral edge part of the steering wheel-side base fabric 42 and the peripheral edge part of the occupant-side base fabric 46 are connected to each other is a connection part 41. The inflated and deployed airbag 40 has a cone shape gradually expanding toward the occupant at a part of the steering wheel-side base fabric 42 located on the attachment member 60-side, and a bowl shape bulging toward the occupant at a part of the occupant-side base fabric 46 located on the occupant-side.

In the meantime, the shape of the base fabric of the airbag and the inflation shape of the airbag are not limited to the above example. For example, the more base fabric pieces may be connected to form the bag-shaped airbag. Also, for example, the airbag 40 may inflate in a bag shape that is long in an upper and lower direction or in a right and left direction.

The airbag 40 is formed with a vent hole 48 (refer to FIGS. 3 to 5). The vent hole 48 is opened on both surfaces of the airbag 40 and provided for discharging the gas in the airbag 40 to an outside of the airbag 40.

The gas flow adjustment member 50 is a member configured to adjust flow of the gas discharged from the vent hole 48 (refer to FIGS. 3 to 5). The gas flow adjustment member 50 is provided at a position of an outer surface of the airbag 40 where the gas flow adjustment member 50 covers the vent hole 48.

In the present exemplary embodiment, the steering wheel-side base fabric 42 is formed with the vent hole 48. Also, the gas flow adjustment member 50 is provided at the position of an outer side of the steering wheel-side base fabric 42 where the gas flow adjustment member covers the vent hole 48. The vent hole 48 and the gas flow adjustment member 50 will be described in more detail later.

Also, the steering wheel-side base fabric 42 is formed with an attachment hole 44h (refer to FIG. 5). A part of the inflator main body part 32 (a part having gas injection ports) is arranged in the airbag 40 through the attachment hole 44h. Also, the steering wheel-side base fabric 42 is formed with a plurality of screw insertion holes 44ha (herein, four screw insertion holes) around the attachment hole 44h.

The inflator 30 and the airbag 40 are attached to the steering wheel 20 by the attachment member 60.

The attachment member 60 is a kind of bracket, and is configured to be attached to the steering wheel 20, more specifically, to the wheel hub 26 in a state where the inflator 30 and the airbag 40 are attached to the attachment member 60.

More specifically, the attachment member 60 is a member having a plate shape and made of metal or the like. The attachment member 60 is formed with an inflator arranging hole 62h, in which the inflator main body part 32 can be arranged, in a central portion of the attachment member 60. The attachment member 60 is formed with screw insertion holes 62ha around the inflator arranging hole 62h. In a state where the inflator main body part 32 is arranged in the inflator arranging hole 62h and the part of the inflator main body part 32 (a part having gas injection ports) is arranged inside the airbag 40 through the attachment hole 44h, screws 68 protruding from an internal fixing plate arranged in the airbag 40 are inserted into the screw insertion holes 44ha, the screw insertion holes 62ha and the fixing holes 34h. Nuts 69 are threaded on the screws 68, and thus, the inflator 30 is fixed to the attachment member 60. Also, a peripheral edge part of the attachment hole 44h of the airbag 40 is interposed between the internal fixing plate and the attachment member 60, and thus, the airbag 40 is fixed to the attachment member 60.

The attachment member 60 is attached to an inner part of the wheel hub 26. The attachment member 60 is attached by engaging an engaging protrusion erected on the wheel center part with an engaging hole part formed in the attachment member 60, for example. The attachment member 60 may be attached to the wheel hub 26 by screw fixing, caulking attachment or the like. Since the attachment member 60 is attached to the inner part of the wheel hub 26, the inflator 30 and the airbag 40 fixed to the attachment member 60 are also housed in the housing recess part 26h of the wheel hub 26.

In the state where the inflator 30 and the airbag 40 are housed in the wheel hub 26, an opening of the housing recess part 26h is covered by a cover 70.

The cover 70 is a member made of plastic or the like, and includes a cover main body part 72 covering the opening of the housing recess part 26h, and a peripheral wall 74 protruding from an inner side of the cover main body part 72 and covering a periphery of the folded airbag 40.

A surface of the cover main body part 72 is formed with a groove 73. Herein, the groove 73 is an annular groove of which a center is a center of the cover main body part 72. The groove 73 is formed with a plurality of through-holes aligned with intervals in an extending direction of the groove 73.

A decorative member 80 is attached to the groove 73. The decorative member 80 is a member that is attached to the cover 70 for decorating the cover 70. Herein, the decorative member 80 includes a decorative main body part 82 that can be fitted in the annular groove 73, and a plurality of leg parts 86 protruding from the decorative main body part 82 with intervals in an extending direction of the decorative main body part 82. The decorative main body part 82 is fitted in the groove 73, and the plurality of leg parts 86 is inserted into the plurality of through-holes formed in the groove 73. In this state, tip end portions of the plurality of leg parts 86 are thermally crushed, and thus, the decorative main body part 82 is attached with being fitted in the groove 73. Herein, a separate decorative member 90 is attached to a central portion of the cover main body part 72.

In the state where the inflator 30 and the folded airbag 40 are attached to the attachment member 60, the cover 70 is attached to the attachment member 60 so that the folded airbag 40 is housed in the cover 70. The cover 70 may be attached to the attachment member 60 by fixing a peripheral part of the attachment member 60 to the peripheral wall 74 in a screw fixing, rivet fixing or engagement manner, for example. Thereby, the cover 70 is also attached to the attachment member 60.

In the state where the attachment member 60 is fixed to the wheel hub 26, the peripheral wall 74 of the cover 70 covers the periphery of the folded airbag 40 in the housing recess part 26h, and the cover main body part 72 blocks the opening of the housing recess part 26h, and thus, the occupant-side of the folded airbag 40 is covered. The cover main body part 72 is formed with a tear line that can be easily torn. When the airbag 40 is inflated, the airbag 40 tears the cover main body part 72 at the tear line to form an opening for inflation of the airbag 40. Then, the airbag 40 can be inflated from the steering wheel 20 toward the occupant through the opening.

The airbag 40 can preferably be inflated and deployed as promptly as possible and receive an occupant as smoothly as possible. Herein, when the airbag 40 is inflated and deployed to some degree, the gas from the airbag 40 is discharged from the vent hole 48 to the outside of the airbag 40. For this reason, it is possible to inflate and deploy the airbag 40 as promptly as possible by the vent hole 48 and to receive the occupant as smoothly as possible.

Also, when the gas is discharged from the vent hole 48 to the outside, thrust force is applied to the airbag 40 in an opposite direction to a discharge direction of the gas. Herein, the airbag 40 preferably receives the occupant with a stable posture. The gas flow adjustment member 50 can contribute to stabilization of the posture of the airbag 40 by controlling the discharge of the gas from the vent hole 48.

The vent hole 48 and the gas flow adjustment member 50 will be described.

The vent hole 48 is formed between the attachment hole 44h of the steering wheel-side base fabric 42 and the peripheral edge part of the steering wheel-side base fabric 42 (refer to FIGS. 3 to 5). Herein, the steering wheel-side base fabric 42 is formed with two vent holes 48. The two vent holes 48 are formed in positions biased rightwards and leftwards from an upper center in the inflated and deployed state of the airbag 40. In the meantime, at least one vent hole only has to be formed. Herein, the vent hole 48 has a circular hole shape. The vent hole may have the other shape, for example, an elliptical hole shape.

Figure 6A:
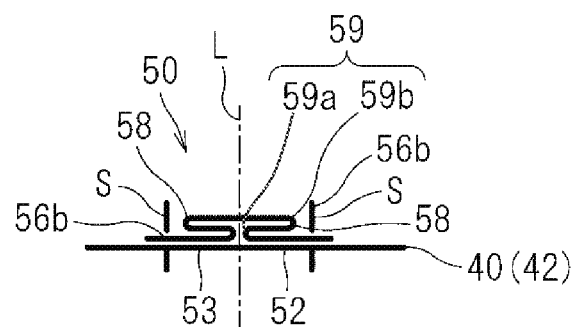
FIGS. 6A to 6C illustrate a gas flow adjustment member.
Figure 6B:
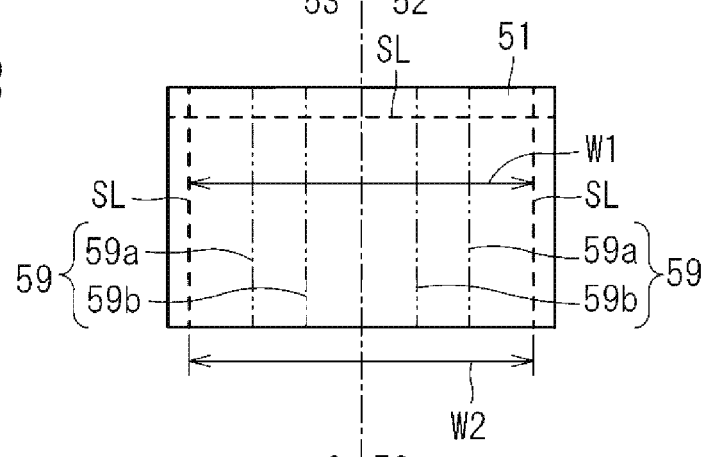
Figure 6C:
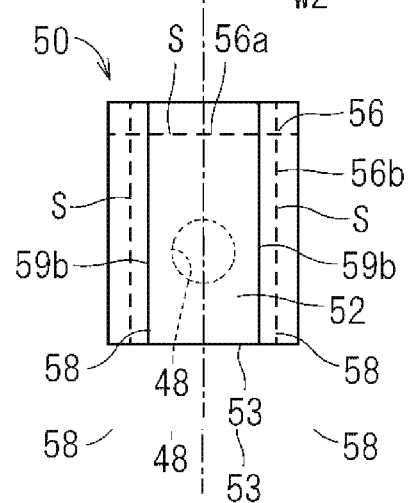

FIGS. 6A to 6C illustrates the gas flow adjustment member 50. FIG. 6A depicts the gas flow adjustment member 50, as seen from an opening edge portion 53. FIG. 6B is a development view of the gas flow adjustment member 50. FIG. 6C depicts the gas flow adjustment member 50, as seen from an outside of the airbag 40.

As shown in FIGS. 3 to 6C, the gas flow adjustment member 50 has a gas receiving part 52 and an attachment edge portion 56. The gas receiving part 52 covers the vent hole 48 from the outside of the airbag 40. A portion of an outer peripheral edge of the gas receiving part 52 is an opening edge portion 53. The opening edge portion 53 is not joined with the vent hole 48 and can be separated outwards from the airbag 40. Herein, the opening edge portion 53 has a linear shape. The opening edge portion may be bent. The attachment edge portion 56 is a portion for attaching a portion of the outer peripheral edge of the gas receiving part 52 except the opening edge portion 53 to the airbag 40. Herein, the gas flow adjustment member 50 is arranged such that the opening edge portion 53 faces toward the attachment member 60.

Since the gas receiving part 52 covers the vent hole 48, the outer peripheral edge of the gas receiving part 52 is arranged to surround the vent hole 48. The portion of the outer peripheral edge of the gas receiving part 52 (i.e. the opening edge portion 53) is not joined with the airbag 40, and the remaining portion of the outer peripheral edge of the gas receiving part 52 (i.e. the attachment edge portion 56) is joined with the airbag 40 so as to partially surround the vent hole 48.

Herein, a portion, which is opposite to the opening edge portion 53, of the attachment edge portion 56 is referred to as an opposite portion 56a, and two side portions of the opposite portion 56a are referred to as a pair of side portions. The opposite portion 56a faces the opening edge portion 53 of the attachment edge portion 56 in a direction perpendicular to an extending direction of the opening edge portion 53. Herein, the opposite portion 56a is a linear portion of the attachment edge portion 56, which is opposite to a widthwise central portion of the opening edge portion 53 in the direction perpendicular to the extending direction of the opening edge portion 53. The two remaining side portions of the attachment edge portion 56 except the opposite portion 56a are the pair of side portions 56b. Herein, the opposite portion 56a and the opening edge portion 53 are linear and are parallel to each other. Also, the pair of side portions 56b is linear and is parallel to each other. Also, the pair of side portions 56b is perpendicular to the opposite portion 56a and the opening edge portion 53.

The gas flow adjustment member 50 is formed with at least one pleat portion 58. The pleat portion 58 includes a fold 59 extending from the opening edge portion 53 toward the opposite portion 56a of the attachment edge portion 56. The fold 59 reaches the opposite portion 56a of the attachment edge portion 56 or extends beyond the opposite portion 56a, and is kept folded at the opposite portion 56a.

Since the gas flow adjustment member 50 is formed with the pleat portion 58 including the fold 59, the gas receiving part 52 can be largely unfolded by unfolding the fold 59 of the pleat portion 58. In particular, since the fold 59 is kept folded at the opposite portion 56a, the gas receiving part 52 can be largely unfolded in the vicinity of the opposite portion 56a by unfolding the fold 59, and thus, the gas receiving part 52 can be largely unfolded as a whole.

Herein, the pleat portion 58 includes a pair of pleat portions 58 separate from each other in the extending direction of the opening edge portion 53. The gas receiving part 52 can be unfolded stably and largely by unfolding the left and right pleat portions 58.

Herein, each of the pleat portions 58 includes, as the fold 59, a first fold 59a located on an outer side of the gas receiving part 52 in the extending direction of the opening edge portion 53, and a second fold 59b located on a central side of the gas receiving part 52. When seeing the airbag 40 from the outside, the first fold 59a is a valley fold, and the second fold 59b is a mountain fold. The second fold 59b is located outward from the first fold 59a with respect to the outer surface of the airbag 40. Herein, the first folds 59a of the two pleat portion 58 are folded at positions at which the first folds 59a face each other with a widthwise central line L of the gas flow adjustment member 50 being interposed between the first folds 59a. The second folds 59b of the two pleat portions 58 are folded at inner positions of the side portions 56b. For this reason, in each of the pleat portions 58, a region between the first fold 59a and the second fold 59b mostly overlaps a region between the side portion 56b and the first fold 59a. Also, a region between the two second folds 59b of the gas receiving part 52 mostly overlaps a region between the two side portions 56b.

In a state where the airbag 40 is not deployed and inflated, a dimension of the gas receiving part 52 in the extending direction of the opening edge portion 53 is referred to as a width dimension. Though the gas receiving part 52 is folded at the fold 59, the width dimension is a dimension in a state where the fold 59 is deployed. Boundaries of the two sides of the gas receiving part 52 are connection portions to the airbag 40, and are, for example, sewing portions. A width dimension of a part of the gas receiving part 52 inward from the opening edge portion 53 is set to be equal to or larger than the dimension of the opening edge portion 53. Herein, the width dimension W1 of the part of the gas receiving part 52 inward from the opening edge portion 53 is set to be equal to the length dimension W2 of the opening edge portion 53 (refer to FIG. 6B). That is, in a state where the fold 59 of the gas receiving part 52 is unfolded, two side edge portions of the gas receiving part 52 extend in parallel, and form a quadrangular shape, herein. In the meantime, the length dimension W2 of the opening edge portion 53 is a dimension in a state where the fold 59 is deployed.

An example in which the width dimension of the part of the gas receiving part inward from the opening edge portion is larger than the length dimension of the opening edge portion will be described later. Also, the configuration in which the width dimension of the part of the gas receiving part 52 inward from the opening edge portion 53 is set to be equal to or larger than the length dimension of the opening edge portion 53 is not necessarily required. For example, the width dimension of the part of the gas receiving part 52 inward from the opening edge portion 53 may be set smaller than the length dimension of the opening edge portion 53. Such a modified embodiment will be described later.

Herein, a diameter of the vent hole 48 is smaller than a half of a dimension between the pair of side portions 56b, and is larger than one third of the dimension between the pair of side portions 56b. Also, when a length dimension of the gas receiving part 52 is referred to as a dimension between the opening edge portion 53 and the opposite portion 56a, the diameter of the vent hole 48 is smaller than one third of the length dimension of the gas receiving part 52, and is larger than one fourth of the length dimension of the gas receiving part 52. The diameter range of the vent hole 48 is just exemplary and is not limited to the above-described range.

In the state where the gas flow adjustment member 50 is attached to the airbag 40, the vent hole 48 is located at a center between the pair of side portions 56b. For this reason, the gas discharged from the vent hole 48 inflates the gas receiving part 52 around a center in a width direction. Also, the vent hole 48 is located closer to the opening edge portion 53 between the opening edge portion 53 and the opposite portion 56a. For this reason, the gas discharged from the vent hole 48 inflates the gas receiving part 52 around a portion closer to the opening edge portion 53.

The gas flow adjustment member 50 may be formed by folding the one base fabric piece 51 and joining the folded base fabric with the airbag 40 (refer to FIGS. 6A to 6C). Herein, the base fabric 51 has a quadrangular shape. As the base fabric 51, a fabric similar to the steering wheel-side base fabric 42 and the occupant-side base fabric 46 may be used.

The base fabric 51 has a quadrangular shape that is long in a direction corresponding to the width direction of the gas receiving part 52. The base fabric 51 is folded at the pair of first folds 59a, which are respectively close to the two sides of the base fabric 51 in the width direction, in a valley fold form, and is folded at the pair of second folds 59b, which are close to the center of the base fabric 51, in a mountain fold form. The pair of first folds 59a faces each other with the widthwise central line L of the base fabric 51 being interposed between the pair of first folds 59a. The pair of second folds 59b is located on an inner side of an outer edge of the base fabric 51 in the width direction. Herein, the pair of firsts fold 59a and the pair of second folds 59b are all parallel to each other.

The base fabric 51 folded as described above is overlapped over portions, in which the vent hole 48 is formed, of the steering wheel-side base fabric 42. In a state where the base fabric 51 is kept folded at the first folds 59a and the second folds 59b, the outer regions of the second folds 59b, which are the two side portions of the base fabric 51, and one end-side region (an outer periphery-side region of the airbag 40 with respect to the vent hole 48) are joined with the steering wheel-side base fabric 42. The joint of the base fabric 51 with the steering wheel-side base fabric 42 is made by sewing using thread S, for example.

The other end-side edge portion (an inner periphery-side edge portion of the airbag 40 with respect to the vent hole 48) of the base fabric 51 is the opening edge portion 53 that is not joined with the airbag 40. Also, a linear portion, which is opposite to the opening edge portion 53 and is joined with the steering wheel-side base fabric 42, of the outer peripheral edge part of the base fabric 51 is the opposite portion 56a. The two side portions of the opposite portion 56a are the pair of side portions 56b. Also, portions folded at the first folds 59a and the second folds 59b on each of the two sides of the base fabric 51 is the pleat portions 58. In each of the pleat portions 58, the first fold 59a and the second fold 59b are joined with the steering wheel-side base fabric 42 at the opposite portion 56a with being folded, and the folded states are kept. For example, when the base fabric 51 is sewn to the airbag 40 by the sewing thread S with being folded at the first folds 59a and the second folds 59b, the base fabric 51 is kept with being folded at the first folds 59a and the second folds 59b by the sewing thread S. Meanwhile, in FIG. 6B, an expected sewing line SL of the base fabric 51 is shown.

Figure 7:
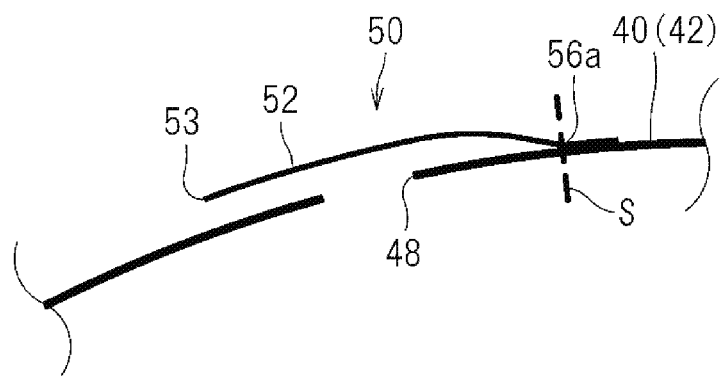
FIG. 7 illustrates an operation of the gas flow adjustment member.
Figure 8:
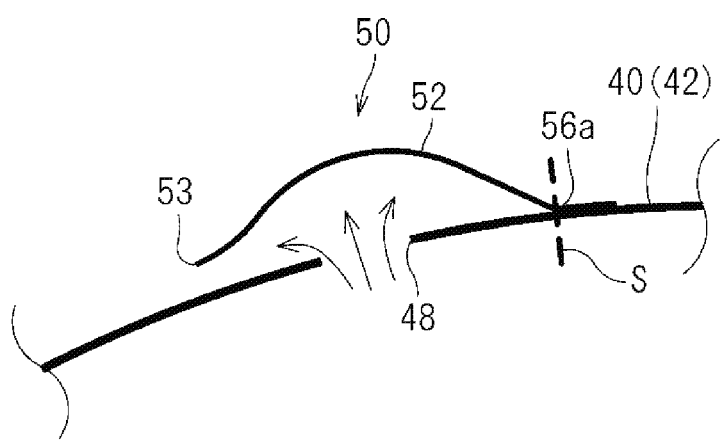
FIG. 8 illustrates the operation of the gas flow adjustment member.
Figure 9:
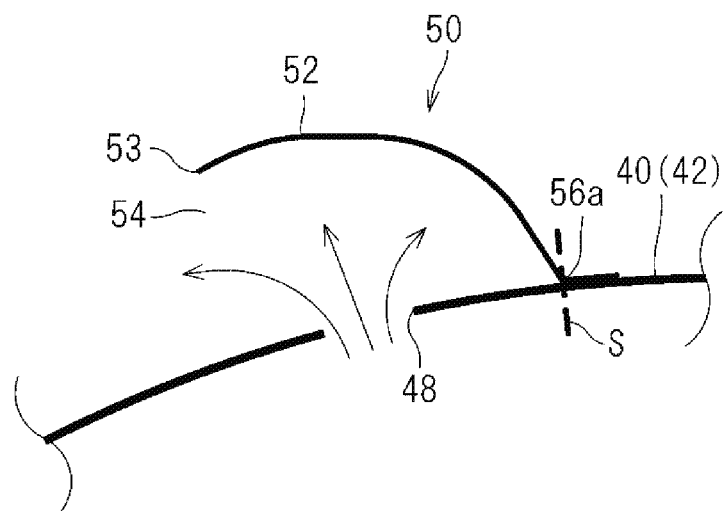
FIG. 9 illustrates the operation of the gas flow adjustment member.

Operations of the airbag device 10 are described, focusing on operations of the gas flow adjustment member 50. FIGS. 7 to 9 illustrate the operations of the gas flow adjustment member 50. FIGS. 7 to 9 are partial sectional views of the airbag 40 and the gas flow adjustment member 50 in the direction perpendicular to the opening edge portion 53.

In an initial state of the airbag device 10, the gas flow adjustment members 50 are housed with being folded at the folds 59, together with the folded airbag 40.

In the initial state, when the inflator 30 generates the gas, the airbag 40 starts to be inflated and deployed by the gas. In the initial state, the gas flow adjustment member 50 is in a state where the gas flow adjustment member 50 is folded in a pleated state. As shown in FIG. 7, the gas flow adjustment member 50 is overlapped over the outer surface of the airbag 40.

When the inflation and deployment of the airbag 40 proceed, the gas is discharged from the vent hole 48. The portion, which faces the vent hole 48, of the gas receiving part 52 of the gas flow adjustment member 50 is lifted by the gas so as to inflate toward the outside of the airbag 40 (refer to FIG. 8). At this time, the fold 59 of the pleat portion 58 extends from the opening edge portion 53 toward the opposite portion 56a and is kept folded at the opposite portion 56a of the attachment edge portion 56. That is, the fold 59 is formed over the entire gas receiving part 52 in the length direction of the gas receiving part 52. For this reason, the gas receiving part 52 can inflate largely and easily as a whole around the portion facing the vent hole by the gas discharged from the vent hole 48. At this time, since the gas receiving part 52 can inflate in the region close to the opposite portion 56a, the gas receiving part 52 can inflate largely as a whole. When the gas receiving part 52 inflates around the portion facing the vent hole 48, the opening edge portion 53 is pulled away from the airbag 40, and thus, an opening 54 is formed between the airbag 40 and the opening edge portion 53 as shown in FIG. 9. The gas discharged from the vent hole 48 is received by the gas receiving part 52, and is smoothly discharged from a space between the outer surface of the airbag 40 and the gas receiving part 52 to the outside through the opening 54.

Since the opening 54 is promptly formed as the inflation and deployment of the airbag 40 proceed, the gas in the airbag 40 is promptly discharged from the vent hole 48 through the opening 54. For this reason, after the airbag 40 is inflated and deployed to some degree, the gas in the airbag 40 can be promptly discharged. For this reason, the airbag 40 can promptly inflate and deploy, and it is possible to receive the occupant as smoothly as possible when the airbag 40 is inflated and deployed to some degree.

According to the airbag device 10 configured as described above, the gas flow adjustment member 50 is formed with at least one pleat portion 58. The pleat portion 58 is formed such that the fold 59 extends from the opening edge portion 53 toward the opposite portion 56a, and the pleat portion 58 is configured such that the fold 59 is kept folded at the opposite portion 56a of the attachment edge portion 56. For this reason, the gas receiving part 52 can be unfolded as a whole and can be unfolded at the portion close to the opposite portion 56a of the attachment edge portion 56. Thereby, when the gas is discharged from the vent hole 48, the gas receiving part 52 can promptly inflate largely around the portion facing the vent hole 48. By the inflation, the opening edge portion 53 is pulled away from the airbag 40, and thus, the opening 54 can be formed. The gas discharged from the vent hole 48 can be promptly discharged to the outside through the opening 54. Thereby, when inflating the airbag 40, the gas flow adjustment member 50 can be unfolded more promptly, and thus, the gas can be discharged more promptly.

Also, the airbag 40 is attached to the steering wheel 20 of the vehicle by the attachment member 60. For this reason, when the airbag 40 is inflated by the gas generated from the inflator 30, the airbag 40 is deployed toward the occupant from the steering wheel-side base fabric 42 attached to the attachment member 60, which is a base end. When the gas in the airbag 40 is discharged outside from the vent hole 48, as it is, thrust force is applied in an opposite direction to a discharge direction, and thus, the airbag 40 rotates about the attachment member 60. In the present exemplary embodiment, since the gas flow adjustment member 50 covers the vent hole 48, the gas discharged from the vent hole 48 inflates the gas flow adjustment member 50. The gas is received by the gas flow adjustment member 50 and temporarily stays inside the gas flow adjustment member 50. For this reason, the flow strength of the gas discharged from the vent hole 48 is reduced, and thus, the thrust force is reduced. Thereby, the airbag 40 hardly rotates about the attachment member 60, and thus, the deployment behavior becomes stable. Also, the opening edge portion 53 faces toward the attachment member 60 and the opening 54 faces toward the attachment member 60. For this reason, the gas is discharged toward the attachment member 60 by the gas flow adjustment member 50, and thus, the thrust force is hardly applied in a direction in which the airbag 40 rotates. From this point, the deployment behavior of the airbag 40 becomes stable.

Also, in the extending direction of the opening edge portion 53, the dimension W1 of the part of the gas receiving part 52 inward from the opening edge portion 53 is equal to or larger than (herein, equal to) the length dimension W2 of the opening edge portion 53. For this reason, the gas receiving part 52 can be largely unfolded in the portion inward from the opening edge portion 53. Thereby, the gas receiving part 52 can be inflated by the gas more largely in a semispherical shape about a portion facing the vent hole 48. Thereby, it is possible to pull more securely the opening edge portion 53 of the gas receiving part 52 away from the airbag 40. Therefore, it is possible to discharge the gas more promptly.

Also, the gas flow adjustment member 50 is provided with the pair of pleat portions 58 separate from each other in the extending direction of the opening edge portion 53. For this reason, when the gas is discharged from the vent hole 48, the gas receiving part 52 can stably inflate with expanding the pair of pleat portions 58 on both sides of the vent hole 48. Thereby, it is possible to stably expand the gas flow adjustment member 50 more promptly, and thus, it is possible to promptly discharge the gas more stably.

Also, each of the pair of pleat portions 58 includes the first fold 59a located on the outer side of the gas receiving part 52 in the extending direction of the opening edge portion 53, and the second fold 59b located on the central side of the gas receiving part 52. Each of the pair of pleat portions 58 is folded such that the second fold 59b is located outward from the first fold 59a with respect to the outer surface of the airbag 40. In this case, the pleat portion is folded such that a central portion of the gas receiving part 52 located between the pair of second folds 59b of the gas receiving part 52 is overlapped on an upper side of the portions located on the outer sides of the pair of second folds 59b. For this reason, when the gas is discharged from the vent hole 48, the gas passes between the pair of first folds 59a, and flows into a portion between the pair of second folds 59b of the gas receiving part 52, thereby inflating the corresponding portion. Thereby, the gas receiving part 52 can smoothly inflate so as to extend the pair of pleat portions 58 around the part between the pair of second folds 59b. Thereby, it is possible to expand the gas flow adjustment member 50 more promptly, and thus, it is possible to discharge the gas more stably and promptly.

Also, the gas flow adjustment member 50 is attached to the airbag 40 such that the vent hole 48 is located closer to the opening edge portion 53. When the gas is discharged from the vent hole 48, the gas receiving part 52 inflates around the portion facing the vent hole 48. Therefore, the gas receiving part 52 inflates around the portion closer to the opening edge portion 53. For this reason, the opening edge portion 53 is smoothly lifted away from the outer surface of the airbag 40, such that the opening 54 is smoothly formed. Thereby, it is possible to discharge the gas more stably and promptly.

MODIFIED EMBODIMENTS

In the exemplary embodiment, as the example in which the width dimension of the part of the gas receiving part 52 inward from the opening edge portion 53 is set to be equal to or larger than the length dimension of the opening edge portion 53, the example in which the width dimension W1 of the part of the gas receiving part 52 inward from the opening edge portion 53 is set to be equal to the length dimension W2 of the opening edge portion 53 has been described.

Figure 10A:
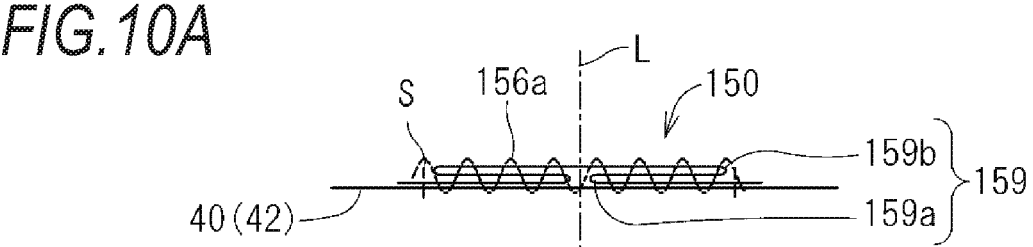
FIGS. 10A to 10C illustrate a gas flow adjustment member of a modified embodiment.
Figure 10B:
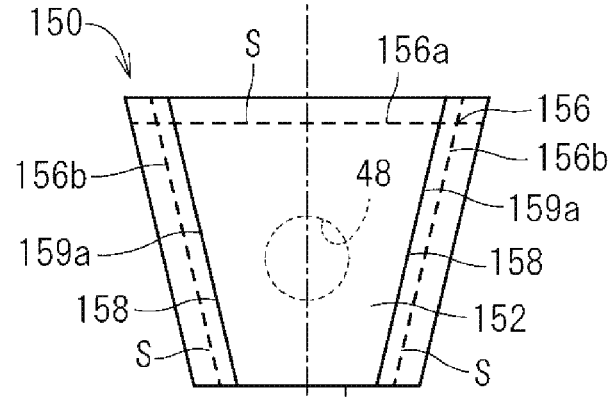
Figure 10C:
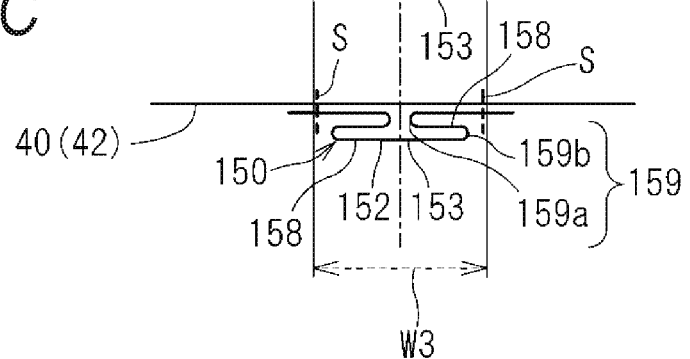

Like a modified embodiment shown in FIGS. 10A to 10C, a width dimension of a part of a gas receiving part 152 (which corresponds to the gas receiving part 52) inward from an opening edge portion 153 (which corresponds to the opening edge portion 53) may be set larger than a length dimension W3 of the opening edge portion 153. FIG. 10B depicts a gas flow adjustment member 150, as seen from the outside of the airbag 40. FIG. 10C depicts the gas flow adjustment member, as seen from the opening edge portion 153. FIG. 10A depicts the gas flow adjustment member, as seen from an opposite portion 156a. This applies to FIGS. 11A to 11C and FIGS. 12A to 12C in the same manner.

In the modified embodiment shown in FIGS. 10A to 10C, a portion of the outer peripheral edge of the gas receiving part 152 is formed as the linear opening edge portion 153. The length dimension of the opening edge portion 153 is denoted as W3. The length dimension W3 is a dimension of the opening edge portion 153 in a state where a fold 159 (which corresponds to the fold 59) is unfolded.

An attachment edge portion 156 (which corresponds to the attachment edge portion 56) of the remaining portion of the outer peripheral edge of the gas receiving part 152 includes the opposite portion 156a opposite to the opening edge portion 153 and a pair of side portions 156b located on two sides of the opposite portion 156a. The opposite portion 156a is parallel to the opening edge portion 153, and is longer than the opening edge portion 153. The pair of side portions 156b is formed such that a width therebetween gradually decreases from the opposite portion 156a toward the opening edge portion 153. For this reason, the attachment edge portion 156 and the opening edge portion 153 form a trapezoidal shape. A lower bottom and an upper bottom of the trapezoidal shape are the opposite portion 156a and the opening edge portion 153, respectively.

At least one (herein, a pair) pleat portion 158 (which corresponds to the pleat portion 58) is provided between the pair of side portions 156b. The pair of pleat portions 158 is folded at folds 159, respectively. The fold 159 includes a first fold 159a located on an outer side of the gas receiving part 152 and a second fold 159b located on a central side of the gas receiving part 152, similarly to the fold 59. Herein, the first fold 159a is formed along the widthwise central line L passing centers of the opening edge portion 153 and the opposite portion 156a, and the second fold 159b is folded along the side portion 156b. The directions of the folds 159a and 159b are not limited to the example. For example, both the first fold and the second fold may be formed along the widthwise central line L or along the side portion 156b. The folds 159a and 159b are kept folded at the opposite portion 156a. In FIGS. 10A to 10C, the folds 159a and 159b are kept folded by the sewing thread S.

In the gas flow adjustment member 150 of the present modified embodiment, the width dimension of the part of the gas receiving part 152 inward from the opening edge portion 153 increases from the opening edge portion 153 toward the opposite portion 156a. For this reason, the width dimension of the part of the gas receiving part 152 inward from the opening edge portion 153 is larger than the length dimension W3 of the opening edge portion 153.

In the present modified embodiment, when the gas is discharged from the vent hole 48, the gas receiving part 152 can inflate largely on the part of gas receiving part 152 inward from the opening edge portion 153. For this reason, it is possible to unfold the opening edge portion 153 away from the airbag 40 more promptly and securely, and thus, it is possible to form the opening for gas discharge promptly and securely. Also, since the gas discharged from the vent hole 48 can temporarily stay inside the gas receiving part 152 with high capacity, the flow strength of the gas discharged from the vent hole 48 can be further reduced.

Figure 11A:
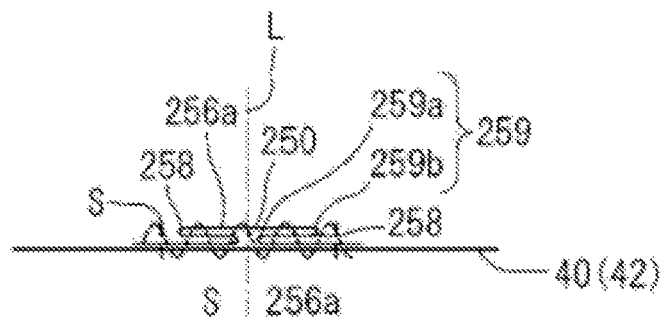
FIGS. 11A to 11C illustrate a gas flow adjustment member of another modified embodiment.
Figure 11B:
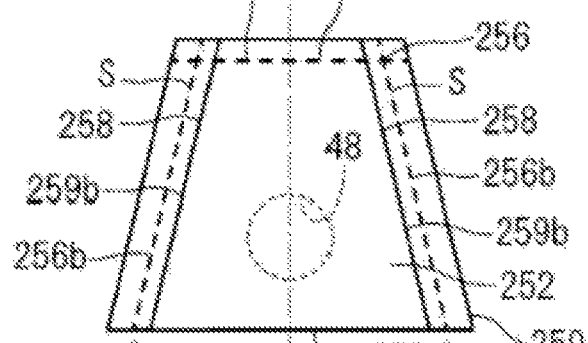
Figure 11C:
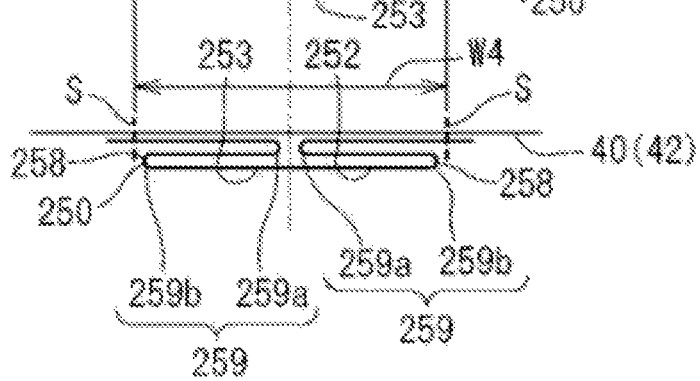

Like a modified embodiment shown in FIGS. 11A to 11C, a width dimension of a part of a gas receiving part 252 (which corresponds to the gas receiving part 52) inward from an opening edge portion 253 (which corresponds to the opening edge portion 53) may be set smaller than a length dimension of the opening edge portion 253.

In the modified embodiment shown in FIGS. 11A to 11C, a portion of the outer peripheral edge of the gas receiving part 252 is formed as the linear opening edge portion 253. The length dimension of the opening edge portion 253 is denoted as W4.

An attachment edge portion 256 (which corresponds to the attachment edge portion 56) of the remaining portion of the outer peripheral edge of the gas receiving part 252 includes an opposite portion 256a opposite to the opening edge portion 253 and a pair of side portions 256b located on two sides of the opposite portion 256a. The opposite portion 256a is parallel to the opening edge portion 253, and is shorter than the opening edge portion 253. The pair of side portions 256b is formed such that a width therebetween gradually increases from the opposite portion 256a toward the opening edge portion 253. For this reason, the opening edge portion 253 and the attachment edge portion 256 form a trapezoidal shape. An upper bottom and a lower bottom of the trapezoidal shape are the opposite portion 256a and the opening edge portion 253, respectively. That is, the trapezoidal shape that is upside down from the case shown in FIGS. 10A to 10C is formed.

At least one (herein, a pair) pleat portion 258 (which corresponds to the pleat portion 58) is provided between the pair of side portions 256b. The pair of pleat portions 258 is folded at folds 259, respectively. The fold 259 includes a first fold 159a located on an outer side of the gas receiving part 252 and a second fold 159b located on a central side of the gas receiving part 252, similarly to the fold 59, and is folded in the similar aspect to the exemplary embodiment. In the folded state, the first fold 259a is formed along the widthwise central line L passing centers of the opening edge portion 253 and the opposite portion 256a, and the second fold 259b is folded along the side portion 256b. The directions of the folds 259a and 259b are not limited to the example. For example, both the first fold and the second fold may be formed along the widthwise central line L or along the side portion 256b.

In the gas flow adjustment member 250 of the present modified embodiment, the width dimension of the part of the gas receiving part 252 inward from the opening edge portion 253 decreases from the opening edge portion 253 toward the opposite portion 256a. For this reason, the width dimension of the part of the gas receiving part 252 inward from the opening edge portion 253 is smaller than the length dimension W4 of the opening edge portion 253.

According to the present modified embodiment, when the gas is discharged from the vent hole 48, the gas receiving part 252 inflates on the part of gas receiving part 252 inward from the opening edge portion 253. Thereby, it is possible to unfold the opening edge portion 253 away from the airbag 40. Therefore, when inflating the airbag 40, it is possible to unfold the gas flow adjustment member 250 more promptly, and thus, it is possible to discharge the gas more promptly.

Also, in the exemplary embodiment and the modified embodiments, the pair of pleat portions 58, 158, 258 is provided. However, the pleat portion may be provided by one or three or more.

Figure 12A:
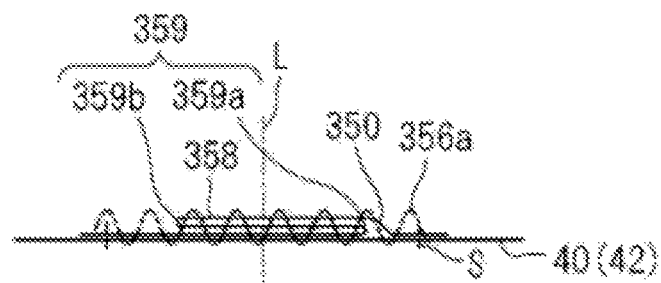
FIGS. 12A to 12C illustrate a gas flow adjustment member of another modified embodiment.
Figure 12B:
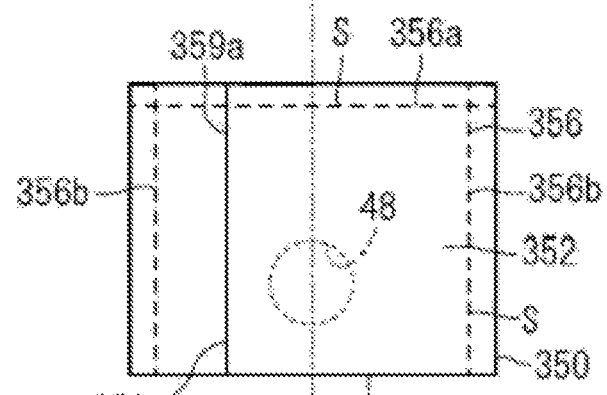
Figure 12C:
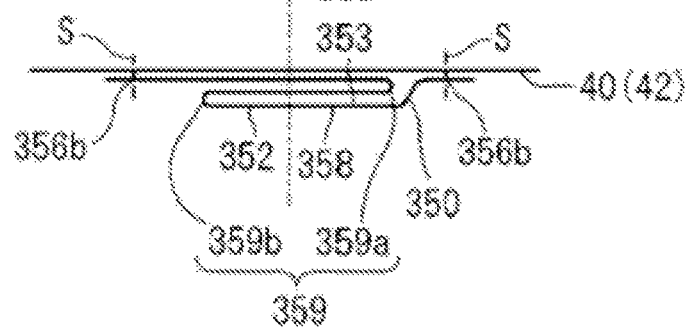

In a modified embodiment shown in FIGS. 12A to 12C, a gas flow adjustment member 350 (which corresponds to the gas flow adjustment member 50) is provided with one pleat portion 358 (which corresponds to the pleat portion 58). The pleat portion 358 has a fold 359 extending from an opening edge portion 353 (which corresponds to the opening edge portion 53) toward an opposite portion 356a (which corresponds to the opposite portion 56a), and the fold 359 is kept folded at the opposite portion 356a. The fold 359 includes a first fold 359a close to one side portion 356b (which corresponds to the side portion 56b) of a gas receiving part 352 (which corresponds to the gas receiving part 52) and a second fold 359b close to another side portion 356b. The gas receiving part 352 is folded in an aspect in which the first fold 359a is arranged on an inner side and the second fold 359b is arranged on an outer side. Also, the first fold 359a and the second fold 359b are kept folded at the opposite portion 356a.

According to the gas flow adjustment member 350 of the modified embodiment, when the gas is discharged from the vent hole 48, the gas receiving part 352 inflates on the part of the gas receiving part 352 inward from the opening edge portion 353. Thereby, it is possible to unfold the opening edge portion 353 away from the airbag 40. Therefore, when inflating the airbag 40, it is possible to unfold the gas flow adjustment member 350 more promptly, and thus, it is possible to discharge the gas more promptly.

The shapes of the gas flow adjustment member and the gas receiving part are not limited to the above examples. For example, the gas receiving part may have a triangular shape. In this case, a portion corresponding to one side of the gas receiving part may be formed as the opening edge portion, and the fold may be formed such that the fold faces from the opening edge portion toward the other two sides or an opposing corner. Also, for example, the gas receiving part may have a semi-circular shape. In this case, a portion, which corresponds to a chord, of the gas receiving part may be formed as the opening edge portion, and the fold may be formed such that the fold faces from the opening edge portion toward a portion corresponding to an arc.

Also, herein, the example in which the airbag device 10 is an airbag device for a driver seat has been described. However, the airbag device may be an airbag device for a front occupant seat, a side airbag device provided on a side or an upper side of an occupant seat, a curtain airbag device or the like.

In the meantime, the respective configurations described in the exemplary embodiment and the modified embodiments can be combined as appropriate insofar as there is no contradiction with each other.

Although the present disclosure has been described in detail above, the above description is merely an example in terms of all aspects, and the present disclosure is not limited to the description. It can be understood that it is possible to conceive numerous modified embodiments, which are not presented as examples, without departing from the scope of the present disclosure.

The disclosure provides illustrative, non-limiting examples as follows:

An airbag device of a first aspect includes: an inflator configured to generate gas; a bag-shaped airbag folded with being housed and configured to be inflated and deployed by the gas, the airbag having a vent hole through which the gas is discharged to an outside of the airbag; and a gas flow adjustment member including: a gas receiving part covering the vent hole from the outside of the airbag; an opening edge portion formed at a portion of an outer peripheral edge of the gas receiving part; and an attachment edge portion for attaching the outer peripheral edge of the gas receiving part except the opening edge portion to the airbag, the attachment edge portion having an opposite portion which is opposite to the opening edge portion, in which the gas flow adjustment member is provided with at least one pleat portion formed such that a fold extends from the opening edge portion toward the opposite portion of the attachment edge portion, and the at least one pleat portion is configured such that the fold is kept folded at the attachment edge portion.

The airbag device of a second aspect is the airbag device of the first aspect further including: an attachment member configured to be attached to a steering wheel of a vehicle, in which the airbag has a steering wheel-side base fabric attached to the attachment member, and an occupant-side base fabric configured to receive an occupant, in which the vent hole is formed in the steering wheel-side base fabric, and in which the gas flow adjustment member is arranged such that the opening edge portion faces toward the attachment member.

The airbag device of a third aspect is the airbag device of the first aspect or the second aspect in which, in an extending direction of the opening edge portion, a dimension of a part of the gas receiving part inward from the opening edge portion is equal to a length dimension of the opening edge portion.

The airbag device of a fourth aspect is the airbag device of the first aspect or the second aspect in which, in an extending direction of the opening edge portion, a dimension of a part of the gas receiving part inward from the opening edge portion is larger than a length dimension of the opening edge portion.

The air bag device of a fifth aspect is the air bag device of any one of the first aspect to the fourth aspect in which the at least one pleat portion has a pair of pleat portions separate from each other in an extending direction of the opening edge portion.

The air bag device of a sixth aspect is the air bag device of the fifth aspect in which each of the pair of pleat portions has a first fold located on an outer side of the gas receiving part in the extending direction of the opening edge portion, and a second fold located on a central side of the gas receiving part, and in which each of the pair of pleat portions is folded such that the second fold is located outward from the first fold with respect to an outer surface of the airbag.

The air bag device of a seventh aspect is the air bag device of any one of the first aspect to the sixth aspect in which the gas flow adjustment member is attached to the airbag such that the vent hole is located closer to the opening edge portion between the opening edge portion and the opposite portion of the attachment edge portion.

According to the first aspect, the gas flow adjustment member is housed with being folded at the fold, together with the folded airbag. When the airbag starts to be inflated and deployed by the gas generated from the inflator, the gas flow adjustment member is kept folded in a pleated state.

When the inflation and deployment of the airbag proceed, the gas starts to be discharged from the vent hole. Herein, the fold of at least one pleat portion is formed to extend from the opening edge portion toward an opposite portion, which is opposite to the opening edge portion, of the attachment edge portion, and is kept folded at the attachment edge portion. For this reason, the gas receiving part is inflated by the gas in a semispherical shape around a portion facing the vent hole. Accompanied by this, the opening edge portion of the gas receiving part is pulled away from the airbag, and an opening is thus formed between the airbag and the opening edge portion, and thus, the gas is discharged through the opening. Thereby, when inflating the airbag, it is possible to unfold the gas flow adjustment member more promptly, and thus it is possible to discharge the gas more promptly.

According to the second aspect, the airbag is configured to be attached to the steering wheel of the vehicle by the attachment member. For this reason, when the airbag is inflated by the gas generated from the inflator, the airbag is deployed toward the occupant from the steering wheel-side base fabric attached to the attachment member, which is a base end. When the gas in the airbag is discharged from the vent hole to the outside, thrust force is applied in an opposite direction to a discharge direction, and thus, the airbag rotates about the attachment member. At this time, the gas flow adjustment member covers the vent hole, so that, after the gas discharged from the vent hole inflates the gas flow adjustment member, the gas temporarily stays inside the gas flow adjustment member. Thereby, the flow strength of the gas discharged from the vent hole is reduced and thus, the thrust force is reduced. For this reason, the airbag hardly rotates about the attachment member, and thus, the deployment behavior becomes stable. Also, the gas is stably discharged toward the attachment member by the gas flow adjustment member.

According to the third and fourth aspect, the gas receiving part can be largely unfolded on the part of the gas receiving part inward from the opening edge portion. For this reason, the gas receiving part can be inflated by the gas more largely in the semispherical shape around the portion, which faces the vent hole. Thereby, it is possible to pull the opening edge portion of the gas receiving part more securely away from the airbag.

According to the fifth aspect, when the gas is discharged from the vent hole, the gas receiving part is stably inflated while unfolding the pair of pleat portions. Thereby, when inflating the airbag, it is possible to stably unfold the gas flow adjustment member more promptly, and to promptly discharge the gas more stably.

According to the sixth aspect, since the pleat portion is folded such that the second fold on the central side of the gas receiving part is located outward from the first fold on the outer side of the gas receiving part with respect to the outer surface of the airbag, the pleat portion is folded such that the central portion of the gas receiving part located between the pair of second folds of the gas receiving part is overlapped on the upper side of a portion located outside the pair of second folds. For this reason, when the gas is discharged from the vent hole, the gas receiving part can easily inflate about the center of the gas receiving part in the width direction.

According to the seventh aspect, the gas flow adjustment member is attached to the airbag such that the vent hole is located closer to the opening edge portion. When the gas is discharged from the vent hole, since the gas receiving part inflates about the portion facing the vent hole, the opening edge portion relatively close to the vent hole is smoothly opened.

What is claimed is:
1. An airbag device comprising:
an inflator configured to generate gas;
a bag-shaped airbag folded with being housed and configured to be inflated and deployed by the gas, the airbag having a vent hole through which the gas is discharged to an outside of the airbag; and
a gas flow adjustment member including:
a gas receiving part covering the vent hole from the outside of the airbag;
an opening edge portion formed at a portion of an outer peripheral edge of the gas receiving part; and
an attachment edge portion for attaching the outer peripheral edge of the gas receiving part except the opening edge portion to the airbag, the attachment edge portion having an opposite portion which is opposite to the opening edge portion,
wherein the gas flow adjustment member is provided with at least one pleat portion formed such that a fold extends from the opening edge portion toward the opposite portion of the attachment edge portion, and the at least one pleat portion is configured such that the fold is kept folded by the attachment edge portion,
wherein the airbag device further comprising: an attachment member configured to be attached to a steering wheel of a vehicle,
wherein the airbag has a steering wheel-side base fabric attached to the attachment member, and an occupant-side base fabric configured to receive an occupant,
wherein the vent hole is formed in the steering wheel-side base fabric, and wherein the gas flow adjustment member is arranged such that the opening edge portion faces toward the attachment member.

2. The airbag device according to claim 1,
wherein, in an extending direction of the opening edge portion, a dimension of a part of the gas receiving part inward from the opening edge portion is equal to a length dimension of the opening edge portion.

3. An airbag device comprising:
an inflator configured to generate gas;
a bag-shaped airbag folded with being housed and configured to be inflated and deployed by the gas, the airbag having a vent hole through which the gas is discharged to an outside of the airbag; and
a gas flow adjustment member including:
a gas receiving part covering the vent hole from the outside of the airbag;
an opening edge portion formed at a portion of an outer peripheral edge of the gas receiving part; and
an attachment edge portion for attaching the outer peripheral edge of the gas receiving part except the opening edge portion to the airbag, the attachment edge portion having an opposite portion which is opposite to the opening edge portion,
wherein the gas flow adjustment member is provided with at least one pleat portion formed such that a fold extends from the opening edge portion toward the opposite portion of the attachment edge portion, and the at least one pleat portion is configured such that the fold is kept folded by the attachment edge portion,
wherein, in an extending direction of the opening edge portion, a dimension of a part of the gas receiving part inward from the opening edge portion is larger than a length dimension of the opening edge portion.

4. The airbag device according to claim 3,
wherein the at least one pleat portion has a pair of pleat portions separate from each other in an extending direction of the opening edge portion.

5. The airbag device according to claim 4,
wherein each of the pair of pleat portions has a first fold located on an outer side of the gas receiving part in the extending direction of the opening edge portion, and a second fold located on a central side of the gas receiving part, and
wherein each of the pair of pleat portions is folded such that the second fold is located outward from the first fold with respect to an outer surface of the airbag.

6. The airbag device according to claim 2,
wherein the gas flow adjustment member is attached to the airbag such that the vent hole is located closer to the opening edge portion between the opening edge portion and the opposite portion of the attachment edge portion.

* * * * *